United States Patent [19]

Lamensdorf

[11] Patent Number: 5,611,329
[45] Date of Patent: Mar. 18, 1997

[54] FLAMELESS HEATER AND METHOD OF MAKING SAME

[75] Inventor: Marc Lamensdorf, Mt. Sinai, N.Y.

[73] Assignee: Truetech, Inc., Riverhead, N.Y.

[21] Appl. No.: 511,561

[22] Filed: Aug. 4, 1995

[51] Int. Cl.$^6$ .................................................. F24J 1/00
[52] U.S. Cl. ........................ 126/263.07; 126/263.05
[58] Field of Search ................. 126/263.01, 263.05, 126/263.07

[56] References Cited

U.S. PATENT DOCUMENTS

| | | | |
|---|---|---|---|
| 2,533,958 | 2/1950 | Root et al. | 126/263.05 |
| 2,823,665 | 2/1958 | Steinbach | 126/263.05 |
| 2,935,983 | 5/1960 | Reik | 126/263.05 |
| 3,550,578 | 12/1970 | Fearon | 126/263.05 |
| 4,106,477 | 8/1978 | Feld | 126/263.05 |

*Primary Examiner*—Carroll B. Dority
*Attorney, Agent, or Firm*—Galgano & Burke

[57] ABSTRACT

A flameless heater includes two non-woven polyester sheets which are thermally bonded together to form a number of pockets. Each pocket is filled with a powder mixture of Mg—Fe alloy, NaCl, antifoaming agents, and an inert filler. The outer surfaces of the polyester sheets are preferably treated with a food grade surfactant. The polyester sheets are gas and water permeable over substantially their entire surfaces and the filled pockets define intervening channels where the polyester sheets are bonded. The resulting heater can be made approximately 50% thinner and 50% lighter than a conventional FRH. In use, both the channels and the permeability of the sheets allow water to wet the powder rapidly and initiate the chemical reactions quickly. The byproducts of the chemical reactions cause the pockets to inflate slightly thereby adding sufficient rigidity to the heater to support a food packet. The byproducts of the chemical reactions exit the pockets through the permeable sheets and are directed away from the reaction via the channels. This rapid removal of the byproducts of the reaction enhances the efficiency of the reactions which allows a smaller, lighter heater to produce the same heat as a larger, heavier heater. By avoiding sintering processes, the heater can be easily and economically mass produced.

20 Claims, 6 Drawing Sheets

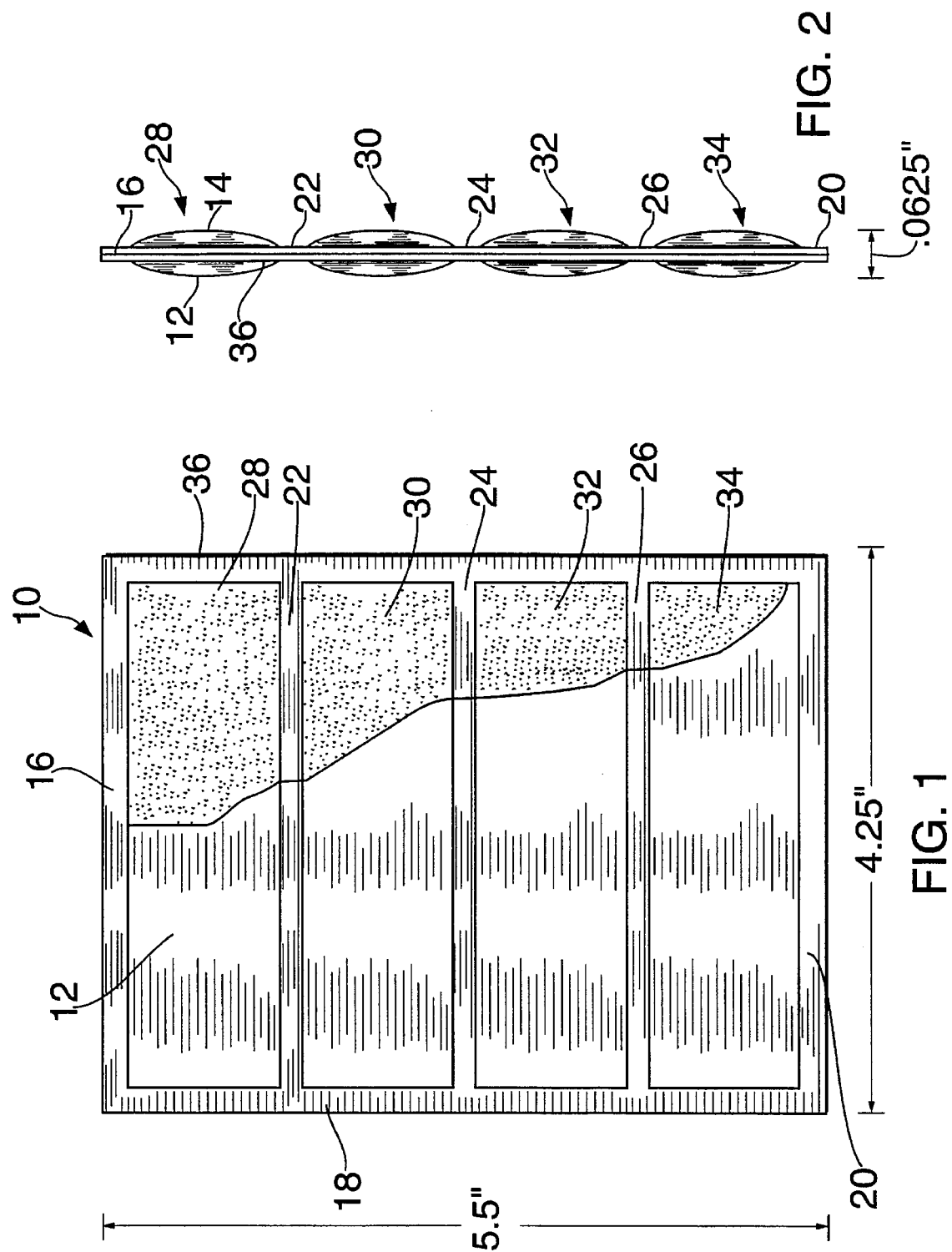

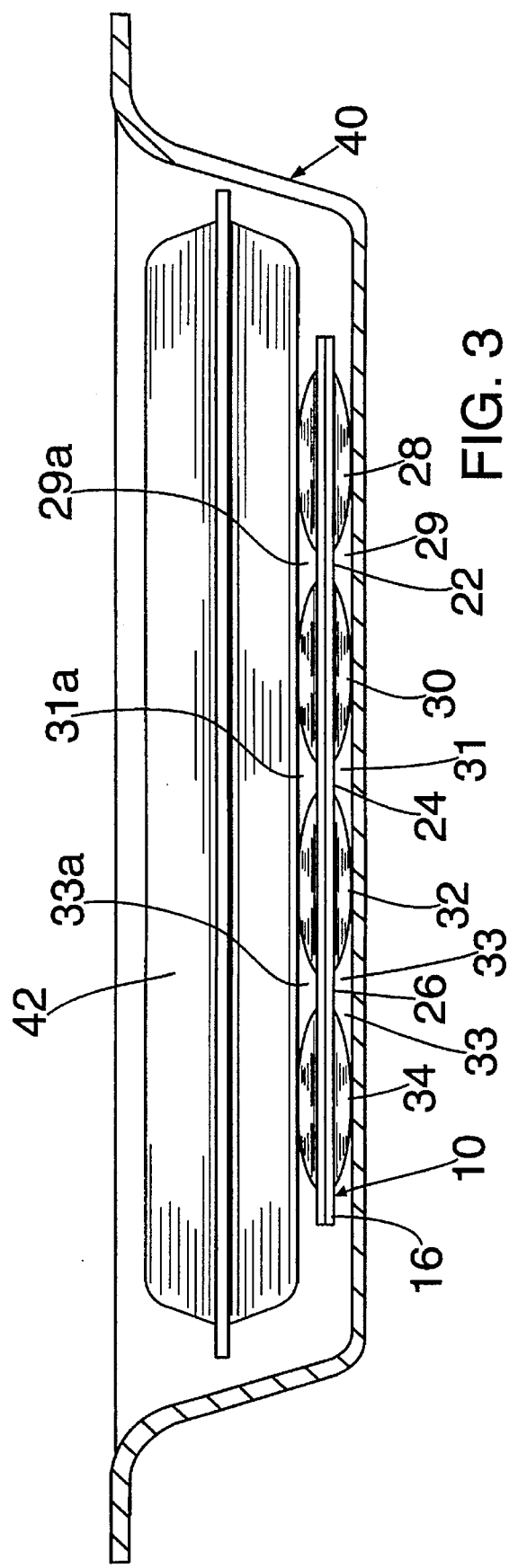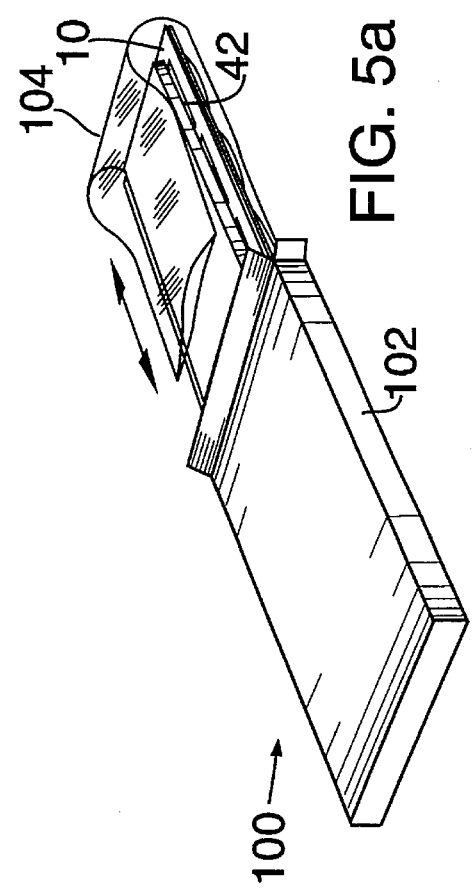

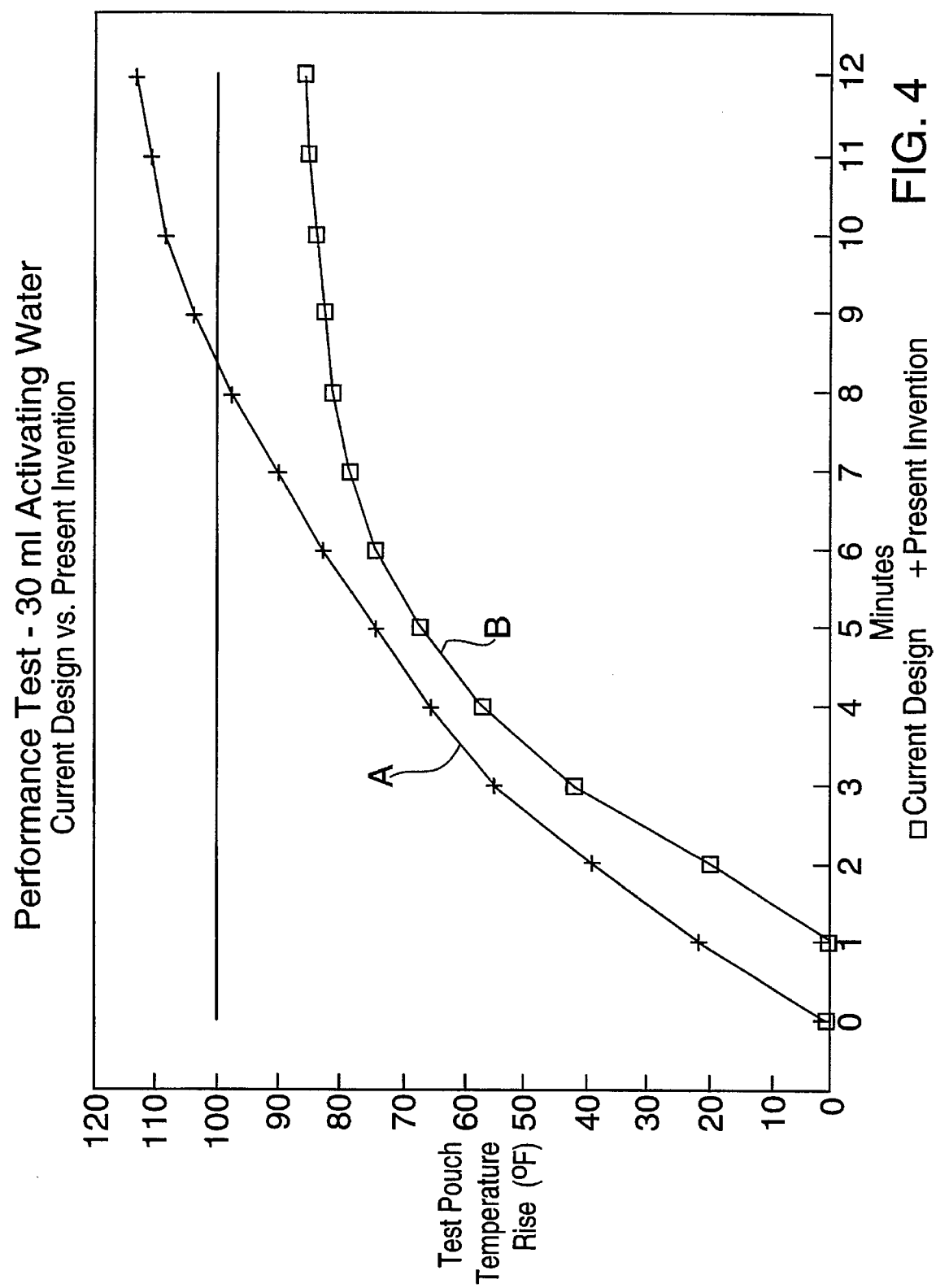

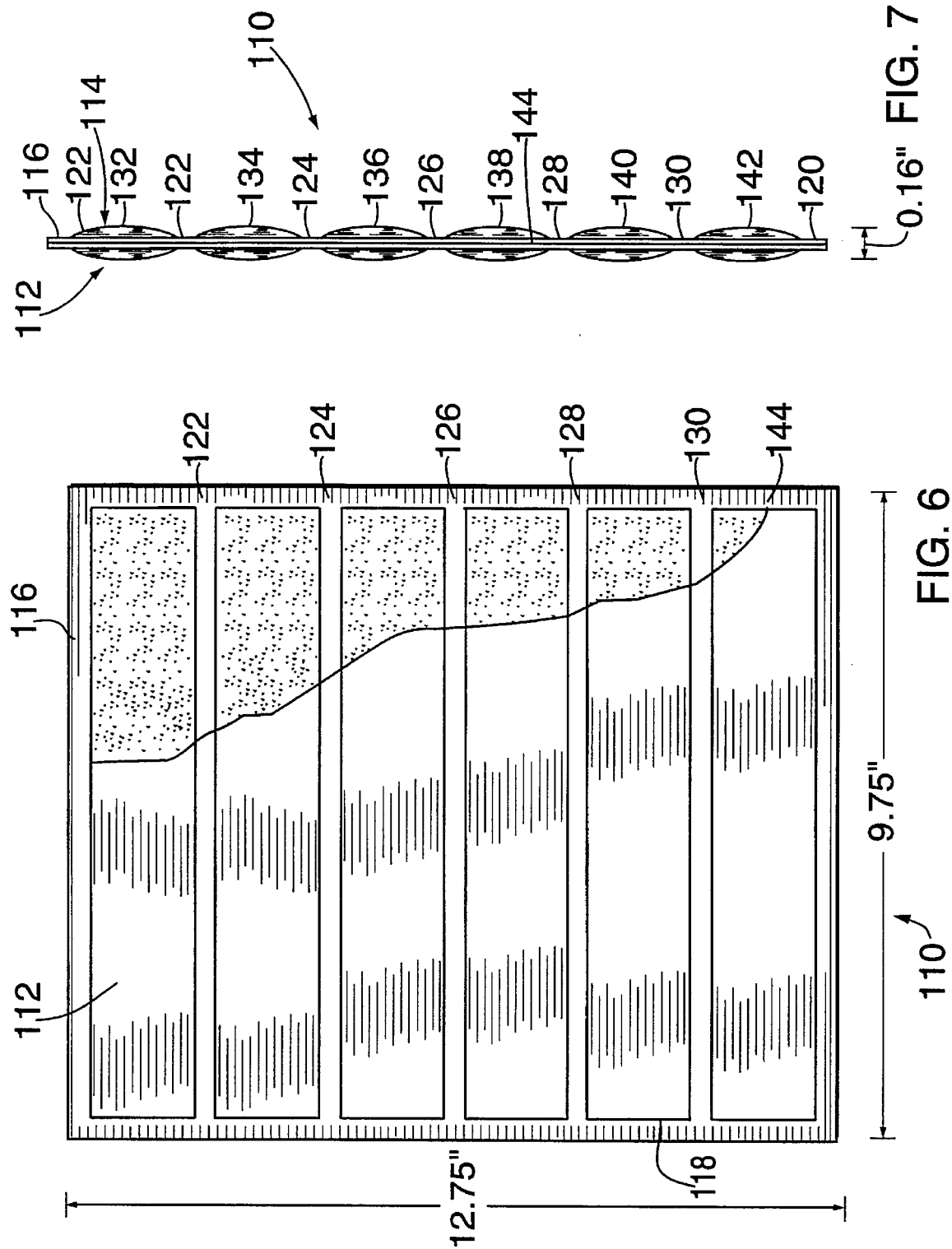

FLAMELESS HEATER AND METHOD OF MAKING SAME

BACKGROUND OF THE INVENTION

1. Field of the Invention

The invention relates to a flameless heater utilizing an exothermic chemical reaction to produce heat and a method of making the heater. More particularly, the invention relates to a flameless heater particularly suited for heating military field rations as well as humanitarian and recreational rations and which meets or exceeds the current U.S. military performance specification, MIL-R-44398B.

2. State of the Art

The U.S. Military has provided individual field rations in a form known as "Meal-Ready-to-Eat" ("MRE"). An MRE is a food product contained within a hermetically sealed pouch. The MRE is heated in the field with a device militarily referred to as a "Flameless Ration Heater" ("FRH"). The FRH contains as its active ingredient a supercorroding alloy comprised of magnesium 5 atomic % iron. This supercorroding alloy is blended together with ultrahigh molecular weight ("UHMW") polyethylene powder, fillers, and electrolyte, the powder mixture being placed in a mold and the mixture heated to sinter it. After cooling, the mixture forms a strong flexible pad with sufficient porosity to allow water to penetrate and wet the alloy. In order to provide the pad with sufficient strength for handling, it has been found that the pad should contain about 50% UHMW polyethylene powder. The pad is packaged within a paperboard cover having holes die cut through each side and then is hermetically sealed within a high density polyethylene bag of sufficient size to hold the heater and a filled MRE pouch. To use the heater, the top of the bag is opened and water added until the water level reaches preprinted fill lines on the bag. The water passes through the holes in the pad cover and by wicking through the paperboard, wets the pad and initiates an exothermic chemical reaction. The reaction takes the general form of: $Mg+2H_2O \rightarrow Mg(OH)_2+H_2+heat$ (and steam).

A typical sintered pad is approximately 3.5"×4.5"×0.125" and weighs approximately 21 grams. When the pad is placed within the paperboard cover, the overall thickness increases to approximately 0.170". The paperboard cover adds approximately 9 grams to the overall weight of the heater, bringing the total weight of the heater to approximately 30 grams. When activated with 45–65 milliliters of water, the heater generates enough heat to raise the temperature of an 8 ounce food package 100° F. above its starting temperature within 12 minutes. This performance is required by Military Specification MIL-R-44398B (Sep. 20, 1993). The components of the state-of-the-art FRH and the sintering method for forming a flexible structure of those ingredients are described generally in U.S. Pat. Nos. 4,522,190 to Kuhn et al. and 4,264,362 to Sergev et al., the complete disclosures of which are hereby incorporated by reference herein.

It is recognized that the weight of the FRH is an important consideration. It is always desirable to reduce the total amount of weight and volume which must be carried by a soldier or camper in the field, or by support elements. Another important consideration is the amount of water needed to activate the heater. Water is often scarce in the field and every ounce of water in a soldier's canteen is precious under field conditions. It is therefore generally understood that the performance of an FRH is improved by reducing its weight and volume, and by reducing the amount of water needed to activate it. It is also important to note that virtually millions of FRH units are currently packed and shipped by contractors and the military every month. Therefore, even minor reductions in the overall weight and volume of an FRH can effect a substantial reduction in shipping weight and volume and thereby reduce shipping costs as well as storage space and costs.

U.S. Pat. No. 5,117,809 to Scaringe et al., the complete disclosure of which is hereby incorporated by reference herein, discloses an improved FRH and method of making it which avoids the need for sintering by containing the loose ingredients within the confines of a cover, at least one face of which is rigid, or within a die-cut rigid skeleton. In lieu of the paperboard cover, the heater pad cover is made of a molded rigid polymeric bottom layer and a porous nonwoven polypropylene top layer. The rigid bottom member provides the rigidity equivalent to '190's sintering and the porous top layer allows water to wet the powder and initiate the reaction. Alternative embodiments use a cardboard bottom layer or porous bottom layer with a rigid middle layer.

Not every military field operation requires the use of MREs and the flameless reaction heater. As mentioned above, these rations are individually packaged and designed for use in situations where more conventional heaters cannot be used. Moreover, it is often the case that group meals are prepared in the field by one or two soldiers to feed anywhere from 20 to 200 soldiers. Group meals are more efficient than individual meals because only a few soldiers need to be distracted from other duties for the preparation of the meal. Recently, it has been proposed that the concepts of the MRE be applied to group meals. The proposed "Self-Heating Group Meal" ("SHGM") is described in U.S. Pat. No. 5,355,869, the complete disclosure of which is hereby incorporated by reference herein. The SHGM described in the '869 patent utilizes a number of heating trays which are provided with stand-offs on their bottom surfaces and a corresponding number of FRH packages which are supported in the trays by the stand-offs. Food pouches containing 6.6 pounds of food are placed directly on top of the FRH packages and water is delivered into the space, created by the stand-offs, between the trays and the FRH packages. The trays are typically 13"×10"×1.5" deep and use slightly modified versions of the FRH packages (12.75"×9.75"×0.156") described in the above-cited '190 and '809 patents.

SUMMARY OF THE INVENTION

It is therefore an object of the invention to provide a flameless heater which weighs less than conventional FRH units.

It is also an object of the invention to provide an FRH which meets or exceeds the performance requirements of Military Specification MIL-R-44398B.

It is another object of the invention to provide an flameless heater which may be manufactured without sintering the component powders.

It is still another object of the invention to provide an FRH which requires less water to activate than conventional FRH units.

It is also an object of the invention to provide an FRH which occupies less volume than conventional FRH units.

It is another object of the invention to provide an flameless heater which does not require a rigid container.

It is still another object of the invention to provide an flameless heater which may be made in various sizes for use in MRE, SHGM or any commercial food package.

Certain of the foregoing and related objects are readily attained in a flameless heater, comprising a first sheet of relatively flexible polymer which is gas and water permeable but will not permit the passage of the powdered ingredients, a second sheet of relatively flexible polymer which is gas and water permeable, said first and second sheets being bonded to each other so as to form a plurality of pockets, and an effective amount of a powder mixture of chemicals which react exothermically in the presence of water, said powder mixture being substantially evenly distributed among and contained within the pockets. The pockets filled with the powder mixture define intervening channels between said pockets, and when water contacts the heater, the water permeates the pocket walls, wets the powder mixture, and initiates an exothermic reaction within each of the pockets. The exothermic reactions generate a heated gaseous byproduct which inflates the pockets rendering the heater relatively rigid, and the gaseous byproducts exit the pockets through the first and second gas permeable sheets and the gaseous byproducts are directed away from the pockets by the channels.

Certain of the foregoing and related objects are also attained in a method of making a flameless heater, which includes the initial steps of providing a first and second substantially rectangular sheet of relatively flexible polymer which is gas and water permeable and forming spaced pockets in at least one of said sheets. The first and second sheets along a plurality of substantially parallel lines and along the periphery thereof are bonded so as to seal the pockets and define intervening channels between the pockets. A powder mixture of chemicals which react exothermically in the presence of water is prepared and the pockets are filled with the powder mixture.

In accordance with a preferred embodiment of the invention as discussed in detail below, the flameless heater of the present invention includes two non-woven polyester sheets which are thermally bonded to form a plurality of pockets. Each pocket is filled with a powder mixture of Mg—Fe alloy, NaCl, antifoaming agents, and an inert filler. The outer surfaces of the polyester sheets are preferably treated with a surfactant. The polyester sheets are gas and water permeable over substantially their entire surfaces and the filled pockets define intervening channels where the polyester sheets are bonded. The resulting FRH can be made approximately 50% thinner and 50% lighter than a conventional FRH. In use, both the channels and the permeability of the sheets allow water to wet the powder rapidly and initiate the chemical reactions quickly. The byproducts of the chemical reaction cause the pockets to inflate slightly thereby adding sufficient rigidity to the FRH to support a food packet. The byproducts of the chemical reactions exit the pockets through the permeable sheets and are directed away from the reaction via the channels. This rapid removal of the byproducts of the reaction enhances the efficiency of the reaction.

A presently preferred embodiment of an FRH according to the invention for use in an MRE package is approximately 5.5"×4.25"×0.085" and weighs approximately 12 grams. The FRH has four parallel pockets, each of which contain a 2.25 gram mixture of MgFe alloy, NaCl, antifoaming agents, and an inert filler. When activated with 30 milliliters of water, the FRH will heat an 8 ounce meal packet over 100° F. above its starting temperature.

A presently preferred embodiment of an flameless heater according to the invention for use with an SHGM system is simply a scaled up version of the FRH used with an MRE. The above-described FRH for use with an MRE contains 9 grams of heating mixture. A standard group meal is 6.6 pounds. A SHGM flameless heater configured with 99 grams of heating mixture will raise the temperature of a group meal 100° F. above its starting temperature.

Additional objects and advantages of the invention will become apparent to those skilled in the art upon reference to the detailed description taken in conjunction with the provided figures.

BRIEF DESCRIPTION OF THE DRAWINGS

FIG. 1 is a partially cut away plan view of a first embodiment of the flameless heater according to the invention;

FIG. 2 is a side elevation view of the heater of FIG. 1 prior to activation;

FIG. 3 is a side elevation view in partial section of the heater of FIGS. 1 and 2 activated and supporting a food pouch in a tray;

FIG. 4 is a graph illustrating the heat output of the first embodiment of the invention as compared to a prior art heater;

FIGS. 5a–5e illustrate field use of the first embodiment of the invention in an MRE;

FIG. 6 is a view similar to FIG. 1 of a second embodiment of the flameless heater according to the invention;

FIG. 7 is a side elevation view of the heater of FIG. 6 prior to activation.

DETAILED DESCRIPTION OF THE PREFERRED EMBODIMENTS

Figure 5B:
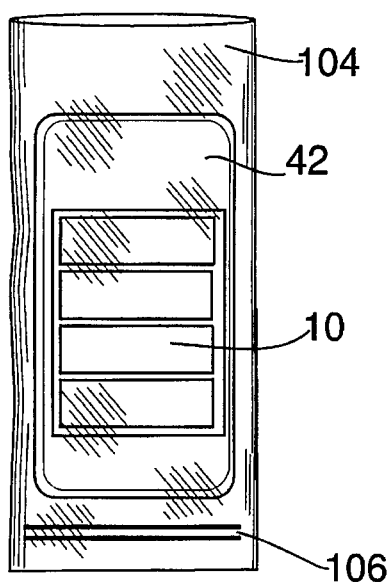

Referring now to FIGS. 1 and 2, a flameless heater 10 according to the invention is made from a pair of non-woven substantially rectangular gas and water permeable plastic sheets 12, 14. The sheets 12 and 14 are thermally bonded along three respective edges 16, 18, 20 and along substantially parallel lines 22, 24, 26 thereby defining four pockets 28, 30, 32, 34. According to a first embodiment of the invention, the sheets 12 and 14 are approximately 4.25" by 5.5" and their edge seals 16, 18, 20 are approximately 0.1875" wide. The sheets are preferably non-woven polyester which is relatively flexible. A mixture of 7.5 grams magnesium 5 atomic weight percent iron supercorroding alloy is blended with 0.7 grams inert filler, 0.5 grams NaCl, and 0.3 grams antifoaming agents is prepared. The 9 gram mixture is evenly divided among the four pockets with each pocket containing approximately 2.25 grams of the mixture. The remaining respective edges 36 of the sheets 12, 14 are then thermally sealed so that the powdered mixture is trapped inside the pockets. The outer surface of the sheets 12, 14 is then preferably coated with a surfactant which helps water permeate the sheets. The assembled heater 10 has a gross weight of approximately 12 grams and an overall thickness of about 0.085". The filled pockets render the heater 10 relatively rigid because of the properties of the polymer sheets, although the heater can be flexed due to the, parallel welds 22, 24, 26 which define the pockets.

Turning now to FIG. 3, the heater 10 may be used by placing it in a tray 40 or other container as described further herein below and by placing a food pouch 42 on top of the heater 10. When water is added to the container 40, it permeates the sheets 12, 16, and initiates exothermic chemical reactions in the pockets 28, 30, 32, 34. As seen in FIG.

3, the parallel welds 22, 24, 26 which define the pockets also define lower channels 29, 31, 33 between the container 40 and the heater 10 as well as upper channels 29a, 31a, 33a between the heater 10 and the food pouch 42. When the chemical reactions are activated, gaseous byproducts of the reactions cause the pockets 28, 30, 32, 34 to inflate slightly rendering the heater 10 more rigid and supporting the food packet 42 above the bottom surface of the container 40. The gaseous byproducts of the reactions eventually permeate through the sheets 12, 14 and into the channels between the pockets where they are directed away from the pockets so as to prevent them from impeding the progress of the reaction. The heater 10, thus described generates sufficient energy to heat the food packet 42 to 100° F. above its starting temperature in less than 12 minutes.

The performance of the invention is illustrated in the graph of FIG. 4 where the vertical axis is the temperature rise in degrees Fahrenheit and the horizontal axis is the elapsed time in minutes. The plot A is the temperature rise of a food pouch heated by the invention and the plot B is the temperature rise of a food pouch heated by a current field ration flameless heater. Both heaters were activated using 30 milliliters of water.

Figure 5C:
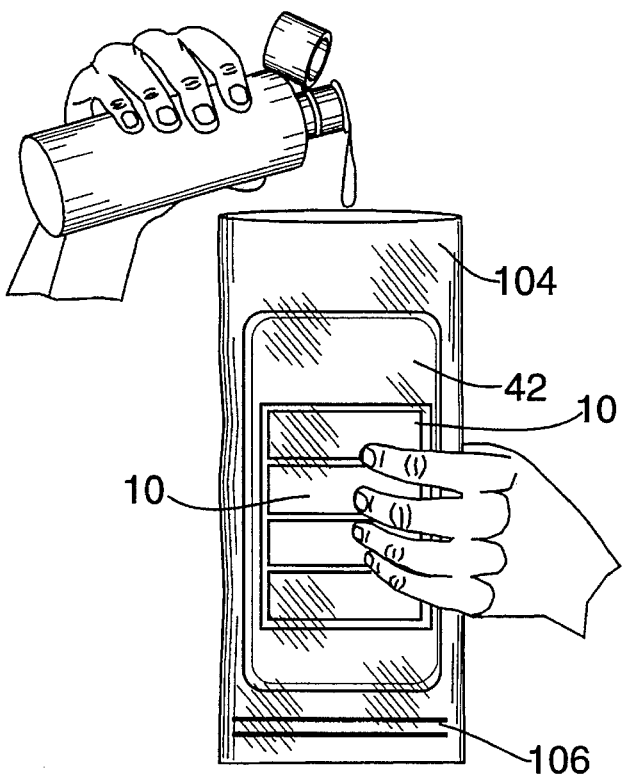
Figure 5D:
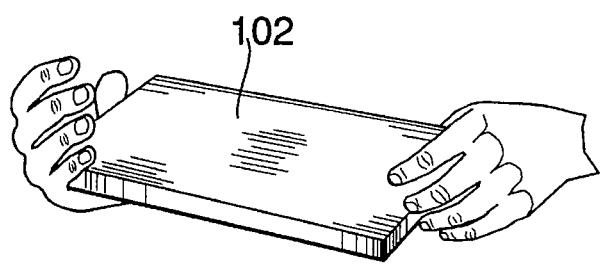
Figure 5E:
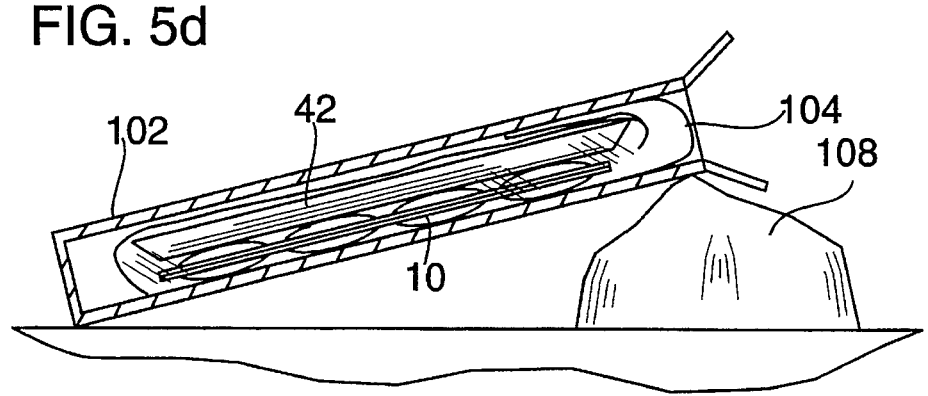

Turning now to FIGS. 5a through 5e, as mentioned above, the heater 10 may be assembled with an MRE. The MRE is packaged in a cardboard box 102 (FIG. 5a). To heat the MRE, the soldier removes the food pouch 42 from the box 102 and places it within the heater bag 104 (FIG. 5b). In order to measure the amount of water, the heater bag 104 is provided with a fill line 106 which when filled to indicates approximately 30 milliliters of water. The soldier adds the water to the heater bag 104 until it reaches the fill line 106, as shown in FIG. 5c. After the water has been added to the pouch, the top of the pouch is folded over and the pouch 104 is returned to the box 102 as shown in FIG. 5a. The box 102 is then held horizontally for one minute as shown in FIG. 5d. It is then placed on an incline by leaning it against a rock or other object 108 as shown in FIG. 5e so that the heater 10 is below the food pouch 42 and the top of the pouch 104 is elevated. After 12 minutes, the meal is heated and ready to be removed from the pouches 104, 42.

FIGS. 6 and 7 show a second embodiment of a larger flameless heater 110 according to the invention which is suitable for use in an SHGM system. The heater 110 is made from a pair of non-woven substantially rectangular gas and water permeable plastic sheets 112, 114. The sheets 112 and 114 are thermally bonded along three respective edges 116, 118, 120 and along substantially parallel lines 122, 124, 126, 128, 130 thereby defining six pockets 132, 134, 136, 138, 140, 142. According to the second embodiment of the invention, the sheets 112 and 114 are approximately 9.75" by 12.75". The sheets are preferably non-woven polyester which is relatively flexible. A mixture of 82.5 grams magnesium 5 atomic weight percent iron supercorroding alloy is blended with 5.5 grams NaCl, 3.3 grams antifoaming agents, and 7.7 grams inert filler is prepared. The 99 gram mixture is evenly divided among the six pockets with each pocket containing approximately 16.5 grams of the mixture. The remaining respective edges 144 of the sheets 112, 114 are then thermally sealed so that the powdered mixture is trapped inside the pockets. The outer surface of the sheets 112, 114 is then preferably coated with a food grade surfactant which helps water permeate the sheets. The assembled heater 110 has a gross weight of approximately 115 grams and an overall thickness of about 0.16". The filled pockets render the heater 110 relatively rigid because of the properties of the polymer sheets, although the heater can be flexed due to the parallel welds 122, 124, 126, 128, 130 which define the pockets.

Figure 8:
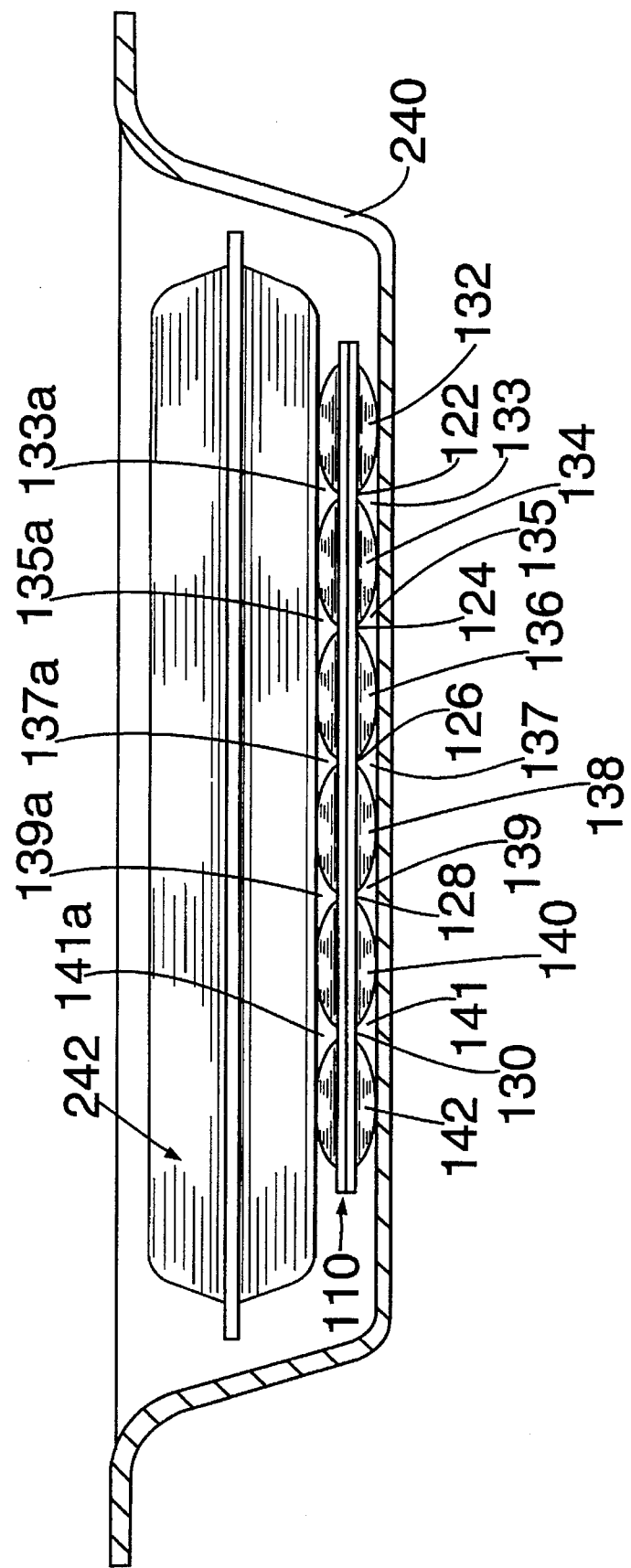
FIG. 8 is a side elevation view in partial section of the heater of FIGS. 6 and 7 activated and supporting a food pouch in a tray.

Turning now to FIG. 8, the heater 110 is used by placing it in a tray 240 or other container and by placing a 6.6 pound food pouch 242 on top of the heater 110. When water is added to the container 240, it permeates the sheets 112, 116, and initiates exothermic chemical reactions in the pockets 132, 134, 136, 138, 140, 142. As seen in FIG. 8, the parallel welds 122, 124, 126, 128, 130 which define the pockets also define lower channels 133, 135, 137, 139, 141 between the container 240 and the heater 110 as well as upper channels 133a, 135a, 137a, 139a, 141a between the heater 110 and the food pouch 242. When the chemical reactions are activated, gaseous byproducts of the reactions cause the pockets 132, 134, 136, 138, 140, 142 to inflate slightly rendering the heater 110 more rigid and supporting the food packet 242 above the bottom surface of the container 240. The gaseous byproducts of the reactions eventually permeate through the sheets 112, 114 and into the channels between the pockets where they are directed away from the pockets so as to prevent them from impeding the progress of the reactions. The heater 110, thus described generates sufficient heat to warm the food packet 242 to 100° F. above its starting temperature in less than 12 minutes.

There have been described and illustrated herein several embodiments of a flameless heater for heating rations in the field. While particular embodiments of the invention have been described, it is not intended that the invention be limited thereto, as it is intended that the invention be as broad in scope as the art will allow and that the specification be read likewise. Thus, while particular formulations of the powder contents of the heater have been disclosed, it will be appreciated that other formulations could be utilized. Also, while the pockets have been shown as substantially parallel extending across the width of the heater, it will be recognized that other types of pockets could be used with similar results obtained provided that the pockets define channels through which the gaseous byproducts of the reactions may escape. Moreover, while particular configurations have been disclosed in reference to the composition of the gas and water permeable sheets, it will be appreciated that other configurations could be used as well provided that the proper permeability and relative flexibility/rigidity is maintained. Also while two embodiments of different size have been disclosed, it will be understood that any size heater can be made by appropriately scaling the components as discussed herein. Moreover, while the heaters described herein are substantially rectangular, it will be appreciated that other shapes may be utilized with similar results obtained. It will therefore be appreciated by those skilled in the art that yet other modifications could be made to the provided invention without deviating from its spirit and scope as so claimed.

What is claimed is:

1. A flameless heater, comprising:

a) a first sheet of relatively flexible polymer which is gas and water permeable;

b) a second sheet of relatively flexible polymer which is gas and water permeable, said first and second sheets being bonded to each other so as to form a plurality of pockets;

c) a powder mixture of chemicals which react exothermically in the presence of water, said powder mixture being substantially evenly distributed among and contained within said pockets, wherein said pockets filled with said powder mixture define intervening channels between said pockets, when water contacts said heater, the water permeates said pockets, wets said powder mixture, and initiates an exothermic reaction in each of said pockets, said exothermic reactions generate a gaseous byproduct which at least partially inflates said pockets rendering said heater relatively rigid, and said gaseous byproducts exit said pockets through said first and second gas permeable sheets and said gaseous byproducts are directed away from said pockets by said channels.

2. A flameless heater according to claim 1, wherein:

said first and second sheets are each a non-woven polyester.

3. A flameless heater according to claim 1, wherein:

said powder mixture weighs approximately 9 grams.

4. A flameless heater according to claim 3, wherein:

said first and second sheet weigh approximately 1.6 grams each.

5. A flameless heater according to claim 4, wherein:

said exothermic reactions generate sufficient heat to raise the temperature of an eight ounce food packet which is placed on said heater approximately 100° F. above the starting temperature of the food packet in less than approximately 12 minutes.

6. A flameless heater according to claim 5, wherein:

said heater has overall dimensions of approximately 4.25" by approximately 5.5" by approximately 0.085" thick.

7. A flameless heater according to claim 1, wherein:

said powder mixture includes magnesium 5 atomic weight percent iron supercorroding alloy, NaCl, antifoaming agents, and inert filler.

8. A flameless heater according to claim 3, wherein:

said powder mixture includes approximately 7.5 grams magnesium 5 atomic weight percent iron supercorroding alloy, approximately 0.7 grams inert filler, 0.5 grams NaCl, and approximately 0.3 grams antifoaming agents.

9. A flameless heater according to claim 1, wherein:

an outer surface of each of said sheets is coated with a surfactant.

10. A flameless heater according to claim 1, wherein:

said powder mixture weighs approximately 99 grams.

11. A flameless heater according to claim 10, wherein:

said first and second sheet weigh approximately 8 grams each.

12. A flameless heater according to claim 11, wherein:

said exothermic reactions generate sufficient heat to raise the temperature of an 6.6 pound food packet which is placed on said heater approximately 100° F. above the starting temperature of the food packet in less than approximately 12 minutes.

13. A flameless heater according to claim 12, wherein:

said heater has overall dimensions of approximately 12.75" by approximately 9.75" by approximately 0.16" thick.

14. A flameless heater according to claim 12, wherein:

said powder mixture includes approximately 82.5 grams magnesium with 5 atomic weight percent iron supercorroding alloy, approximately 7.7 grams inert filler, approximately 5.5 grams NaCl, approximately 3.3 grams antifoaming agents.

15. A method of making a flameless heater, comprising the steps of:

a) providing a first substantially rectangular sheet of relatively flexible polymer which is gas and water permeable;

b) providing a second substantially rectangular sheet of relatively flexible polymer which is gas and water permeable;

c) forming spaced-apart pockets in at least one of said sheets;

d) preparing a powder mixture of chemicals which react exothermically in the presence of water;

e) filling said pockets with said powder mixture; and f) bonding said first and second sheets along the periphery thereof and along a plurality of substantially parallel lines so as to seal said pockets and define intervening channels between said pockets.

16. A method according to claim 15, wherein:

said first and second sheets are each a non-woven polyester.

17. A method according to claim 15, further comprising:

g) coating said first and second sheets with a surfactant.

18. A method according to claim 15, wherein:

said powder mixture weighs approximately 9 grams.

19. A method according to claim 18, wherein:

said first and second sheet weigh approximately 1.6 grams each.

20. A method according to claim 19, wherein:

said powder mixture includes approximately 7.5 grams magnesium with 5 atomic weight percent iron supercorroding alloy, approximately 0.7 grams inert filler, approximately 0.5 grams NaCl, and approximately 0.3 grams antifoaming agents.

* * * * *